United States Patent [19]
Worden

[11] 3,757,567
[45] Sept. 11, 1973

[54] METHOD FOR DETERMINING FORMABILITY OF MATERIAL

[75] Inventor: Donald P. Worden, Racine, Wis.

[73] Assignee: Tenneco Inc., Racine, Wis.

[22] Filed: Nov. 9, 1970

[21] Appl. No.: 87,798

[52] U.S. Cl. .................................................. 73/81
[51] Int. Cl. ........................................... G01n 3/42
[58] Field of Search .................. 73/81, 83, 78, 104, 73/82; 29/33 T

[56] References Cited
UNITED STATES PATENTS

| | | | |
|---|---|---|---|
| 2,722,831 | 11/1955 | Smith | 73/81 |
| 2,567,333 | 9/1951 | Gogan | 73/81 X |
| 2,938,377 | 5/1960 | Sklar | 73/83 |

Primary Examiner—Jerry W. Myracle
Attorney—Harness, Dickey and Pierce

[57] ABSTRACT

Susceptibility of welded tubing to splitting as a result of cold working is determined by comparing resistance to deformation readings throughout a transverse cross section of the tubing, the readings being taken on a Rockwell hardness tester using a penetrator having a specially shaped penetrating edge.

9 Claims, 9 Drawing Figures

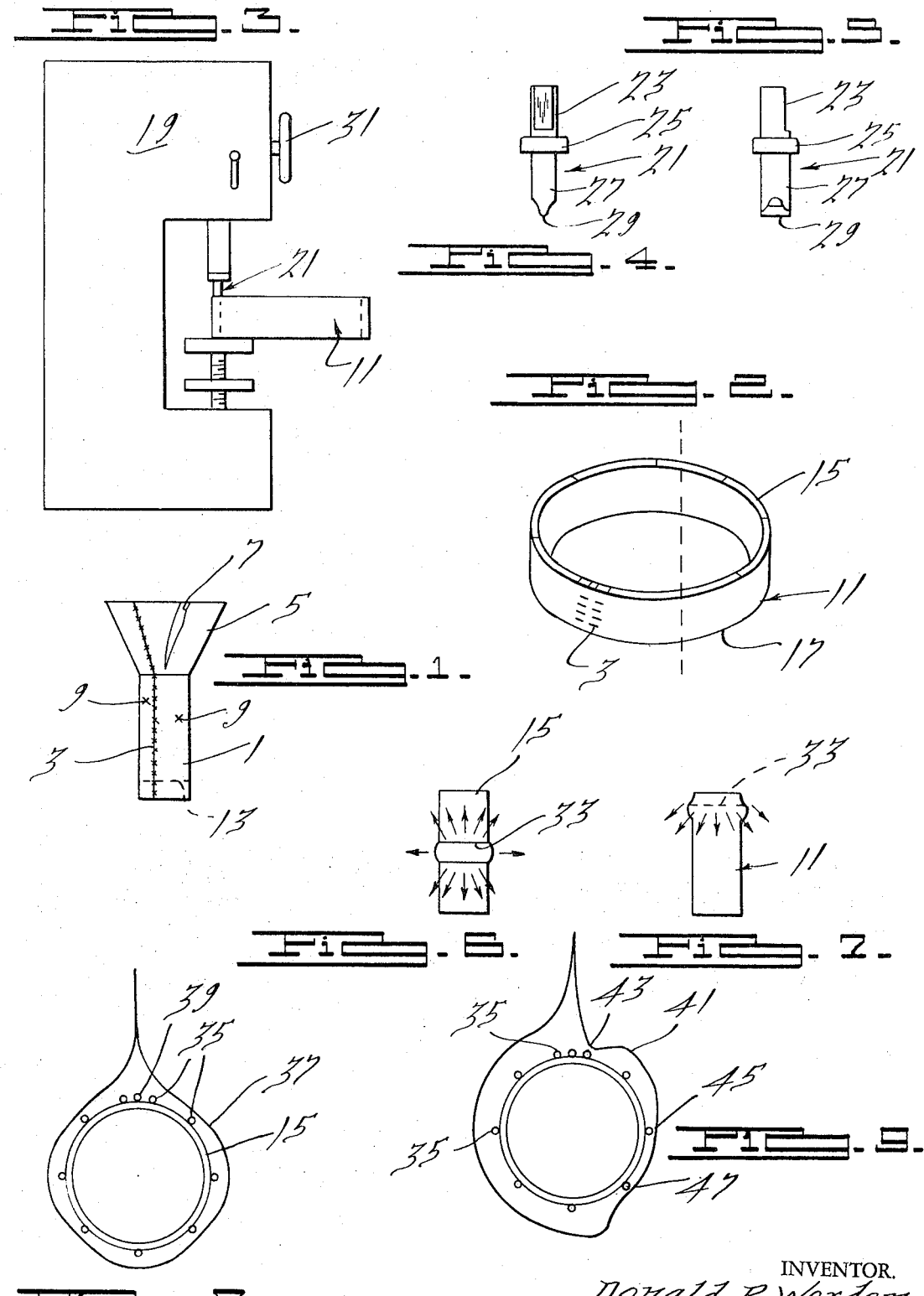

METHOD FOR DETERMINING FORMABILITY OF MATERIAL

BACKGROUND OF THE INVENTION

Welded steel tubing, such as used in exhaust gas systems for automobiles to form exhaust pipes and tailpipes, usually must be cold worked at one or both ends so that it can fit with other components in the exhaust system. Thus, it is common to swage, expand, size, or form special configurations in the ends of the tubing, most of which involve radial expansion and often other stressing of the tube end. Frequently, one of these pipes splits during the cold-working operation, usually one involving expansion or increase in diameter of the pipe. Such fractures cause the pipe to be scrapped and since they occur during one of the final operations on the pipe, the loss due to scrapping is substantial inasmuch as the part was practically a completed product.

In an attempt to predict whether a given piece of tubing might split during an end operation, various tests have been employed on the tubing as well as on the strip steel from which the welded tubing is originally formed. These tests include macro and micro-hardness, optical and electron microscopy, x-ray defraction, and micro-magnetic inspection, as well as Rockwell hardness tests on the "B" Scale around the outer surface of the tubing. These various tests have failed to show differences that could be relied on to predict splitting-type failure during the end operations.

BRIEF SUMMARY OF THE INVENTION

It is the purpose of the present invention to provide a method and means for testing tubing which will reveal differences in metal properties, such as variations that may be interpreted to indicate the likelihood that tubing will split during cold working or to measure changes in formability caused by aging, or mechanical or thermal operations or treatments.

The method of the invention involves the measurement of the resistance to deformation of welded cold rolled steel tubing in a direction parallel to the centerline of the tubing; that is, on the edge of the tube or on a transverse cross section. Thus, the measurement is taken in the direction of mill rolling of the coil stock from which the welded tubing is formed in the tube mill. Conventionally, a Rockwell hardness tester would be the device of choice to make readings of this nature. However, the conventional "B" Scale ball-type Rockwell penetrator tends to deflect laterally on the edge of the tubing and does not give reasonably accurate readings, if any readings at all.

Accordingly, an additional object of the invention is to provide a penetrator for use with the Rockwell test machine that will give reliable resistance to deformation measurements on a cross section of the tubing wall. This goal is achieved by means of a penetrator that fits in the Rockwell machine and can be used with the "B" Scale and which has, preferably, a cylindrical-shaped penetrating edge extending at right angles to the axis of the testing load. Preferably, the length of the cylindrical surface is in excess of the wall thickness of the tubing being tested so that the impression made by the tool extends radially across the entire wall thickness.

DESCRIPTION OF THE DRAWINGS

FIG. 1 is a side elevation of a piece of welded steel tubing having a flare formed in one end resulting in the formation of a split;

FIG. 2 is an enlarged annular section cut from the piece of tubing in FIG. 1 to serve as a test section;

FIG. 3 is a schematic side elevation of a typical Rockwell hardness testing machine showing a test section, such as the one of FIG. 2, in position for a hardness reading;

FIG. 4 is a side elevation of a penetrating tool in accordance with this invention;

FIG. 5 is a view taken at right angles to the view of FIG. 4;

FIG. 6 is a plan view of a section of tubing showing the impression being made after hardness testing in accordance with this inveniton;

FIG. 7 is a side view taken from the right of FIG. 6;

FIG. 8 is a formability curve obtained by plotting along radial lines the hardness reading obtained at that radial section by means of the test of the invention and shows a curve in which satisfactory cold working may be expected; and FIG. 9 is another formability curve showing a hardness pattern indicating that the tubing tested would probably split during the end operation.

DESCRIPTION OF THE INVENTION

In FIG. 1, the tubing 1 is formed by suitable means from strip steel and has a longitudinally extending weld 3 running the full length of the tubing. One end of the tubing 1 has been radially expanded by suitable apparatus as indicated by the flare 5. The expansion produces circumferential or hoop stresses in the metal of the section 5 that results in the fracture or split 7 which ruins the part 1 and causes it to be scrapped. It is the purpose of this invention to provide a test that will predict when a fracture such as the split 7 is likely to occur in a piece of welded steel tubing. It would be within the broad scope of the invention to use it to determine formability of metal other than a welded tubing and such other applications may be considered the equivalent of the testing of welded tubing.

In the past, a conventional method, among others, to determine the forming quality of the tubing 1 has been to take hardness readings on various points of its outer surface such as the points 9. These readings are taken with the force applied to the penetrator extending transversely to the axis of the tubing and, as already indicated, have not been useful in providing reliable information for determining the susceptibility of the tubing to split. It is a concept of the present invention to determine the resistance to deformation pattern of the tubing by applying testing forces in a direction parallel to the tubing axis and to measure deformation resistance across an end section or cross section that is transverse to the tubing axis. The resistance to deformation is measured around the entire circumference of the section and the reading compared to determine uniformity throughout the area of the section.

FIG. 2 shows a section 11 that has been removed from the tubing 1 by cutting it off the end of the tube along the line 13. For the purpose of the present invention the section 11 is preferably at least 1 inch in length and the end surfaces 15 and 17 are machined or ground in a suitable way to be flat and parallel to each other. If the actual hardness readings are to be taken on the surface 15 about one-eighth inch of material should be removed by a method involving minimum cold working of the metal, such as grinding. After this is done, the surface should be lightly polished to relieve residual stresses and provide smoothness.

The test section 11 can be used in a Rockwell hardness machine 19 and readings taken around the circumference of the surface 15. The optimum value of this invention appears in connection with tubing having a relatively thin wall, such as 0.060 inch thickness.

Accordingly, the invention provides a penetrating tool 21 that comprises an attachment portion 23, a collar 25, and a shank 27. The attachment portion 23 fits in the Rockwell machine and is inserted until parts on the machine abut collar 25. The shank 27 then projects out of the machine and has the bottom end 29 to engage the surface being tested, such as the surface 15. The tool 21 is made of hardened steel and in accordance with this invention the bottom edge 29 is of a cylindrical configuration, preferably a 1/16 inch diameter cylindrical shape that extends the full width of the shank 27, as seen in FIG. 5. This width preferably exceeds the width of the surface 15 or the tubing wall thickness, preferably being about ¼ inch long. A cylindrical-shaped configuration for the penetration edge 29 is preferred through a V-shaped or other shaped edges may be useful for certain testing applications.

When the penetrator 21 is used in the Rockwell machine conventional operating procedures are followed. Thus, the penetrator 21 is given the initial 10 kg load and then the dial 31 is set to zero and the load raised to 60 to 100 kg and a reading taken on the dial 31 when the needle comes to rest. In the case of very soft material the pointer will revolve two or three times before finally coming to rest on the scale 31 and such revolutions should be noted in the reading.

The impression formed in the surface 15 by the penetrating edge 29 is shown at 33 in FIGS. 6 and 7. It is apparent that it is a channel extending across the full width of the tubing wall and opening into both the inner and outer peripheries.

In order to determine the formability, or resistance to splitting, of the tubing 1 a series of tests are formed on the section 11 at angularly spaced points around the circumference of the section. In FIGS. 8 and 9 the location of the various impressions 33 are indicated by the circles 35. Th deformation profile of the various points 35 is indicated by the curve 37 which is a line joining the readings as measured along a radius extending through the angular position of the reading. The location of the weld 3 is at point 39 and it will be seen that the resistance to deformation is materially greater at that point and adjacent to it while the slightly higher readings at the 90°, 180°, and 270° points were due, probably, to cold working by the rolls in the tube mill. Around the circumference of the tubing in FIG. 8 the resistance to deformation is relatively constant (except at the weld point) and this indicates that there are no points of excessive dissimilarity relative to the other sections that would create a "weak link" condition leading to failure by splitting during radial expansion of the tubing.

In contrast to the rather uniform reading (except for the weld area) plotted in FIG. 8, the curve 41 of FIG. 9 indicates relatively low readings at the sections 43, 45, and 47. These low readings indicate that the material is less resistant to deformation at these points relative to the remainder of the tubing circumference and less resistant to stretching or mechanical working than the areas immediately adjacent. Thus, one can predict that the tubing will split along lines indicated at one of the points 43, 45, or 47 if drastic radial forces are applied, as in formation of the flare 5. Occasionally, splitting occurs at a point next to where there is an abnormally high reading using tool 21, and this is believed to be due to localized brittleness and a localized transition zone. It will be seen that radical non-uniformity of readings is, therefore, the indicator of probable fracture.

The results of the test of this invention using the penetrator of this invention are presently considered significant only in indicating relative formability of different areas of one sample and comparisons between readings of samples taken from different tubes are not presently considered meaningful. Also, the readings on a particular test sample must be compared with other readings that are taken at substantially the same time, since changes occur in the metal if it is allowed to sit between readings for a significant period of time.

It is not presently known what factors or characteristics of the metal are measured by the test but experience has shown that it is a significant and reliable indicator of the formability of the metal with respect to its ability to withstand radial expansion without fracture or splitting. Apparently, the test involves the combination of the factors of thickness, yield strength, tensile strength, elongation, strain rate or cold work hardening, as well as hardness.

Thus, the invention provides an index or means to identify tubing or metal which is susceptible to splitting when stretched in forming. This means is a simple test using equipment that, except for penetrator 21, is readily available on the open market and which avoids a composite of various different measurements obtained in other ways. The test produces a comparative pattern of resistance to deformation on a specific test piece taken from a particular tubing that is valuable in indicating where the split zone, if any, is located on the tubing; that is, in the area of the low readings.

It is apparent that the invention will be useful in testing coils of steel before they are actually formed into tubing. In this case a 1 inch long test specimen is taken from the coil stock transverse to the length of the coil so that it ocrresponds to the specimen 11 obtained after formation of the tube.

Modifications and variations may be made without departing from the spirit and scope of the invention.

I claim:

1. A method of testing for the susceptibility of welded steel tubing to splitting due to cold working type end operations comprising sectioning the tubing to provide a cross sectional surface with respect to the tube axis, and measuring the relative resistance to deformation at numerous points on said surface to provide a comparison of deformation resistance throughout the area of the surface, said comparison of deformation resistances providing test information indicating the utility of the tubing for forming purposes wherein uniformity of resistances indicate low susceptibility to splitting.

2. A method as set forth in claim 1 wherein said resistance to deformation is measured by forcing a penetrator under calibrated load into the surface and measuring the size of the impression formed by the penetration.

3. A method as set forth in claim 2 wherein a penetrator is utilized that extends across the entire wall thickness of the surface at the point being measured whereby the impression measured extends across the entire wall thickness.

4. A method as set forth in claim 3 wherein a Rockwell hardness test machine is utilized to measure the relative resistance to deformation.

5. A method as set forth in claim 4 wherein the "B" scale of the Rockwell tester is utilized.

6. A method as set forth in claim 4 wherein a penetrator is utilized having a penetrating edge for engaging said surface that extends across the entire wall thickness of the cross section.

7. A method as set forth in claim 6 wherein the edge is cylindrical in shape so that the impression is cylindrical in shape.

8. A method of testing for the proneness to splitting of welded steel tubing comprising sectioning the tubing to provide a cross sectional surface perpendicular to the tube axis, forcing the same penetrator under a standardized calibrated load into various angularly separated points around the entire circumference of the surface to form indentated impressions extending radially across the entire width of the tubing wall at the point of indentation, and measuring the size of each of the impressions to provide comparative readings for indicating the presence of hard or soft spots in the cross section.

9. A method of testing for the formability of metal strip which comprises taking a full width test section of the strip in a direction transverse to the length of the strip, treating the test section to prepare it for testing on a Rockwell hardness machine, taking readings under identical conditions along the entire length of an edge of the test section using the same penetrator and one that forms an impression extending across the entire thickness of the test section, and measuring the size of each of the impressions to provide comparative readings for indicating the presence of hard or soft spots in the cross section.

* * * * *